United States Patent [19]

Guzy

[11] 4,273,953

[45] * Jun. 16, 1981

[54] SPLICE FOR LEAD-SHEATHED CABLE

[75] Inventor: Raymond L. Guzy, Morton Grove, Ill.

[73] Assignee: Centrilift, Inc., Tulsa, Okla.

[ * ] Notice: The portion of the term of this patent subsequent to Nov. 18, 1997, has been disclaimed.

[21] Appl. No.: 4,256

[22] Filed: Jan. 18, 1979

[51] Int. Cl.³ .......................................... H02G 15/18
[52] U.S. Cl. ........................... 174/84 R; 174/DIG. 8; 156/49; 29/868; 29/871
[58] Field of Search ............ 174/84 R, 88 R, DIG. 8; 156/49; 29/628

[56] References Cited

U.S. PATENT DOCUMENTS

| 3,035,113 | 5/1962 | Danchuk | 174/74 |
| 3,095,468 | 6/1963 | Klein | 174/88 R |
| 3,127,291 | 3/1964 | Betz et al. | 156/49 |
| 3,187,088 | 6/1965 | Warner | 174/91 |
| 3,691,505 | 9/1972 | Graves | 174/88 R X |
| 3,717,717 | 2/1973 | Cunningham et al. | 174/88 R X |
| 3,781,458 | 12/1973 | May | 174/84 C |
| 3,783,057 | 1/1974 | McNerney | 156/49 |
| 4,084,307 | 4/1978 | Schultz et al. | 136/49 X |

Primary Examiner—Roy N. Envall, Jr.
Attorney, Agent, or Firm—Robert A. Felsman

[57] ABSTRACT

A cable splice comprising a metallic sleeve member joining the conductor ends, a layer of adhesive over the sleeve member adjacent insulation and lead sheath, a helically-wrapped insulation layer formed of a thermosetting polymer, an overlapped layer of fabric surrounding the insulation layer, an overlapped layer of lead foil surrounding the fabric layer and extending over the lead sheath a helically-wrapped heat-shrinkable tape layer surrounding the lead foil layer and a heat-shrinkable sleeve surrounding the splice area which resists invasion by corrosive well fluids and consequent corrosive in high pressure gassy wells, and a method for forming said cable splice.

7 Claims, 1 Drawing Figure

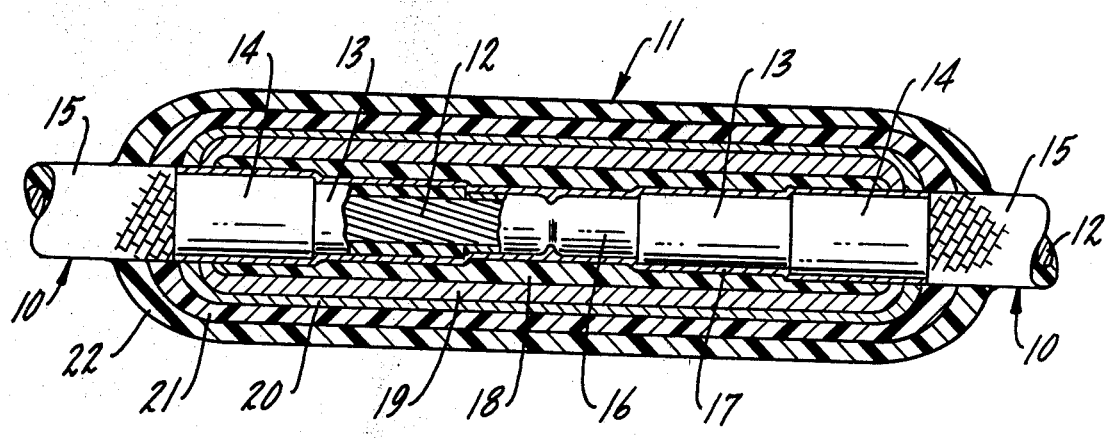

SPLICE FOR LEAD-SHEATHED CABLE

BACKGROUND OF THE INVENTION

This invention relates to a cable splice for an electrical cable and to a method for making a cable splice. More particularly, this invention relates to a cable splice for use in high temperature, high pressure gassy oil wells adapted to prevent corrosive attack on the conductors by sulfide gases and to a method for making said cable splices.

In general, cable structures employed for oil well service have stranded metallic conductors, usually formed of copper, separately insulated with a material of high dielectric strength, cabled and surrounded by an outer armor. In joining cable sections, a splice is formed between the conductors comprising a metallic member frictionally engaging the conductors which is insulated by a section of insulant surrounding any remaining exposed areas of the conductors and the metallic member. The section of insulant typically is formed by a plurality of layers of insulating tape, which may be further protected and confined by a heat shrinkable sleeve positioned over the splice insulation and extending over the adjacent insulation to seal the splice area.

Where the well cable is to be employed in wells containing corrosive gases, particularly sulfides, invasion of the cable structure by corrosive well fluids under high pressure occurs either by way of pinholes or other defects in the primary insulation of the cable or by gas permeation. The conductors are particularly susceptible to attack and corrosion by the sulfides, which results in destruction of the conductors and a shortened cable life.

One method for preventing sulfide attack on the conductors has been the sheathing of the conductor and insulation with a sulfide-impervious layer such as metallic lead. The lead sheath acts as a barrier to exclude the sulfide-containing fluids from the cable structure. In splicing such lead-sheath conductors, it has been the practice to cover the insulated splice with an outer casing formed of heavy gauge lead sheet. The outer casing is soldered to the lead cable sheath at each end of the splice and along the casing seam to seal the splice area and prevent the invasion of corrosive fluids. In practice, and particularly under field conditions, the forming and soldering of the lead casing is a slow and difficult operation to carry out. Damage to the cable insulation can occur through application of excessive heat during the soldering operation, and forming perfect solder joints under field conditions, is difficult, increasing the possibility of invasion of the splice area by corrosive fluids.

A method for forming a cable splice between lead sheathed conductors which would provide a substantial barrier to the intrusion of well-fluids and which could be carried out rapidly under field conditions would thus be a useful advance in the art.

SUMMARY OF THE INVENTION

This invention provides a cable splice that is resistant to invasion by corrosive well fluids and corrosive failure, and a method for making said cable splice. More particularly, this invention provides a cable splice having an adhesive layer, an insulation layer formed of a thermosetting elastomeric polymer having a limited degree of porosity, a fabric layer which surrounds and confines the insulation layer a lead foil layer, and two layers of heat-shrinkable polymer, and a method for splicing and insulating an electrical cable.

The cable conductors to be joined through the splice of this invention will typically comprise a stranded conductor, an insulation layer surrounding the conductors, a lead sheath surrounding the insulation layer, and fiber braid surrounding the lead sheath. To form the splice the conductors are trimmed to expose undamaged ends, the braid layer, if present, is trimmed to expose a portion of the lead sheath, the lead sheath is trimmed to expose a portion of the primary insulation and the exposed insulation is scraped or buffed to remove dirt and roughen the surfaces. The exposed conductor ends are joined by conventional means such as with a deformable metallic sleeve, and the metallic sleeve, any remaining exposed area of the conductors, the insulation, the lead sheath and a portion of the braid layer is coated with an adhesive. Insulating tape formed of a thermosetting elastomeric polymer is then helically wound over the exposed insulation and conductors. An elongated strip of fabric is applied over the insulating tape in overlapped relationship and is optionally secured by application of an adhesive to the end portions and lap area. An elongated strip of lead foil is then applied over the fabric, extending over the exposed areas of lead sheath, in an overlapped relationship, and secured by application of adhesive to the end portions and lap area. The lead foil is then covered with a helically-wound layer of heat-shrinkable tape, and a sleeve member formed of heat-shrinkable tubing is positioned to extend over splice area including any braid-covered portions. Heat sufficient to shrink the heat-shrinkable tape and tubing is then applied to compress and secure the insulation, fabric and foil layers.

The splice made in accordance with this invention is suitable for service when immersed in and surrounded by corrosive well fluids under high temperatures and pressures, and is not susceptible to corrosion of the conductors. Corrosive well fluids including sulfides are excluded from the splice structure by the lead foil, thus preventing attack on the conductors and subsequent failure.

DESCRIPTION OF THE DRAWINGS

The FIGURE is a side view in partial section showing a pair of cable ends joined through a cable splice.

DESCRIPTION OF THE PREFERRED EMBODIMENTS

Referring now to the drawings, there is shown in the FIGURE a pair of cable ends 10 which have metallic conductors 12 covered with insulation 13, lead sheath 14 and braid layer 15. Conductors of this construction are widely employed in the cable art and do not form a part of the instant invention. The cable ends 10 are joined through cable splice 11, comprising a metallic sleeve 16, adhesive layer 17, insulating tape layer 18, fabric layer 19, lead foil layer 20, heat-shrinkable polymeric tape layer 21 and heat-shrinkable sleeve layer 22.

In forming a cable splice according to the instant invention, cable ends 10 are trimmed to remove a section of the insulation to expose lengths of the conductors 12, further trimmed to remove a section of braid layer 15 to expose lengths of the lead sheath 14, and further trimmed to remove a section of the lead sheath of expose lengths of the insulation 13. The exposed conductors are joined by inserting in a metallic sleeve 16, which is then deformed to frictionally engage the conductors.

Any exposed areas of the conductors, the metallic sleeve, the exposed areas of the insulation and lead sheath and preferably a portion of the braid are then coated with an adhesive 17. Adhesives suitable for the purposes of this invention generally are liquid, preferably solvent-free, adhesives such as, for example, liquid epoxy resins, liquid urethanes, and the like, which cure without heat to form a strong, flexible, water-and oil-impervious bond. The adhesive serves to form a tight bond between the metallic sleeve and cable insulation and the insulating tape layer subsequently applied over the adhesive layer.

One or more layers of insulating tape 18 is then applied over the adhesive layer in the splice area with a helical wrap to cover the exposed insulation, any remaining exposed conductor area and the metallic sleeve. In general, it will be desirable to first apply sufficient insulating tape over the metallic sleeve area to fill the area to the level of the adjacent cable insulation, then to complete the layer with a single helical wrap extending over the exposed insulation at each end. The insulating tape is formed of a thermosetting elastomeric polymer which, when cured, is an excellent electrical insulator at elevated temperatures and virtually impervious to attack by oil and other well fluids. An essential property of the polymer is a limited degree of porosity in that it is capable of imbibing very low molecular weight hydrocarbons when under high pressure and then readily desorbing the imbibed gassy hydrocarbons when external pressure is removed. One such material useful for these purposes is a modified EPDM (ethylene-propylene-diene monomer terpolymer) blend such as is disclosed in U.S. Pat. No. 3,926,900. When employed for the purposes of this invention in the form of an insulating tape, the polymer is uncured, the requisite curing being carried out when construction of the splice is completed.

Over the layer of insulating tape is placed a single wrap of fabric 19. The fabric may be applied in the form of an elongated strip wrapped to overlap along the length of the splice. Fabric 19 may alternatively be applied in the form of a fabric tape helically wound along the length of the splice. A number of woven fabric materials may be used for the purposes of this invention including, for example, nylon, polyester, rayon, fluorocarbon, cotton, fabrics formed from glass filament or fiber and the like. It is essential that the fabric withstand exposure to the well fluids without degradation or substantial loss in tensile strength. A liquid adhesive may be applied to the lap area and to the end areas.

Over the fabric is applied a single wrap of lead foil 20 extending over the exposed lead sheath. Preferably the foil will be applied in the form of an elongated strip wrapped to overlap along the length of the splice. Alternatively, lead foil may be applied in the form of a foil tape helically wound along the length of the splice and extending over the lead sheath. The lead foil empolyed may be of any convenient thickness, but preferably will be in the range of from 2 to 8 mils in thickness. Heavier gauge foils are inconvenient to handle and result in bulky, cumbersome splices.

Over the lead foil layer is applied a single, helically-wound tape layer 21 formed of heat-shrinkable polymeric material such as PTFE, PFE and the like.

A sleeve 22 of heat-shrinkable tubing is then positioned to surround the splice area, extending over a portion of the braid at both ends of the splice area. Heat is then applied to the entire splice to shrink the sleeve 22 and the heat-shrinkable tape layer 21, thus compressing and tightly confining the insulation fabric and foil layers. Multiple wraps of heat-shrinkable tape are to be avoided. For the purposes of this invention, the combination of the heat-shrinkable tape and sleeve are intended only to confine and compress the foil, insulation and fabric layers, and not to form a complete seal against the intrusion of corrosive well fluids.

The splice may then be further heated to effect curing of the insulation layer. This curing step is optional inasmuch-as the temperatures encountered in service in most well-bore applications will quickly effect the requisite curing.

EXAMPLE 1

A splice was constructed according to the principles set forth above, employing nylon fabric as the fabric layer, 4 mil lead foil to form the foil layer, PFE to form the heat-shrinkable tape layer and PFE heat-shrinkable tubing to form the sleeve layers, and cured at 325°–350° F. The splice was placed in a pressure vessel containing 50% aqueous ammonium sulfide, heated to 300° F. and held for one week. On removal from the test vessel, the cable was dissected and the splice examined. No erosion of the conductors or insulation had occurred.

EXAMPLE 2

A splice was constructed for comparison purposes essentially according to the principles set forth above, as in Example 1, but the lead foil layer was omitted. After exposure to aqueous ammonium sulfide at 300° F. for one week, upon subsequent removal the insulation had split and the conductors had eroded to a flakey, crystalline material. It will thus be apparent that the lead foil layer effectively excludes invasion by the corrosive sulfide fluid, preventing attack on the insulation and conductors.

The invention will thus be seen to be a cable splice which is resistant to attack by corrosive well fluids, and a method for forming a cable splice.

I claim:

1. A cable splice comprising a metallic sleeve member extending over conductor end portions and frictionally engaging the conductor end portions;
   a layer of adhesive covering said sleeve member and extending over the exposed cable insulation and exposed lead sheath;
   an insulation layer of uncured thermosetting elastomeric polymer tape surrounding said layer of adhesive in a helical wrap;
   an overlapped layer of fabric surrounding said insulation layer;
   an overlapped layer of foil surrounding said layer of fabric;
   a helically-wrapped layer of heat-shrinkable polymeric material tape surrounding said layer of foil; and
   a sleeve of heat-shrinkable polymeric material surrounding the layer of heat-shrinkable polymeric material tape.

2. The cable splice of claim 1 wherein the lead foil layer end portions and lap area are coated with an adhesive.

3. The cable splice of claim 1 wherein the thermosetting elastomeric polymer tape is cured by a thermal post-treatment.

4. A method for forming a cable splice comprising the steps of
- joining the exposed conductor ends with sleeve means frictionally engaging said conductor ends;
- coating the sleeve means, the exposed conductor ends the exposed insulation and the exposed lead sheath with a liquid adhesive;
- applying an insulation layer of uncured thermosetting elastomeric polymer tape over the adhesive coating in a helical wrap;
- applying an overlapping layer of fabric to surround said insulation layer;
- applying an overlapping layer of lead foil to surround said fabric layer;
- applying a layer of heat-shrinkable polymeric material tape in a helical wrap; and
- positioning a sleeve of heat-shrinkable polymeric material to surround the layer of heat-shrinkable tape.

5. The method of claim 4 wherein the layer of lead foil is coated in the end and overlap areas with an adhesive.

6. The method of claim 4 further comprising the step of thermally-treating the splice to shrink the heat-shrinkable materials.

7. The method of claim 6 further comprising the step of thermally-treating the splice to cure the thermosetting elastomeric polymer.

* * * * *